United States Patent [19]
Fortescue

[11] 3,976,542
[45] Aug. 24, 1976

[54] FUEL ELEMENT HAVING VARIABLE ORIFICE

[75] Inventor: Peter Fortescue, La Jolla, Calif.

[73] Assignee: General Atomic Company, San Diego, Calif.

[22] Filed: May 25, 1973

[21] Appl. No.: 364,083

Related U.S. Application Data

[62] Division of Ser. No. 863,497, Oct. 3, 1969, Pat. No. 3,743,576.

[52] U.S. Cl. .................................. 176/43; 176/61; 138/46
[51] Int. Cl.² ........................................ G21C 15/00
[58] Field of Search ............ 176/43, 78, 61; 138/46, 138/43, 45

[56] References Cited
UNITED STATES PATENTS

| | | | |
|---|---|---|---|
| 3,036,965 | 5/1962 | Braun | 176/43 |
| 3,060,111 | 10/1962 | Sherman et al. | 176/43 |
| 3,223,589 | 12/1965 | Ziegler | 176/43 |
| 3,486,973 | 12/1969 | Georges et al. | 176/43 |
| 3,533,911 | 10/1970 | Fortescue et al. | 176/43 |

FOREIGN PATENTS OR APPLICATIONS

| | | |
|---|---|---|
| 1,092,534 | 11/1967 | United Kingdom .................. 176/43 |
| 1,081,188 | 8/1967 | United Kingdom .................. 176/43 |
| 897,450 | 5/1962 | United Kingdom .................. 176/43 |

OTHER PUBLICATIONS

Power Reactor Technology, vol. 5, No. 3, June 1962, pp. 41, 42.

*Primary Examiner*—Harvey E. Behrend
*Attorney, Agent, or Firm*—Fitch, Even, Tabin & Luedeka

[57] ABSTRACT

A fuel element for a gas-cooled nuclear reactor having a housing surrounding a plurality of fuel pins through which coolant flows over the fuel pins. The housing has a portion of varying cross section and a plug disposed within the housing adjacent the portion. The plug and housing form a generally annular orifice through which the gas coolant flows, the size of which orifice is variable in accordance with the axial position of the plug, which can be varied from exterior of the reactor pressure vessel.

7 Claims, 3 Drawing Figures

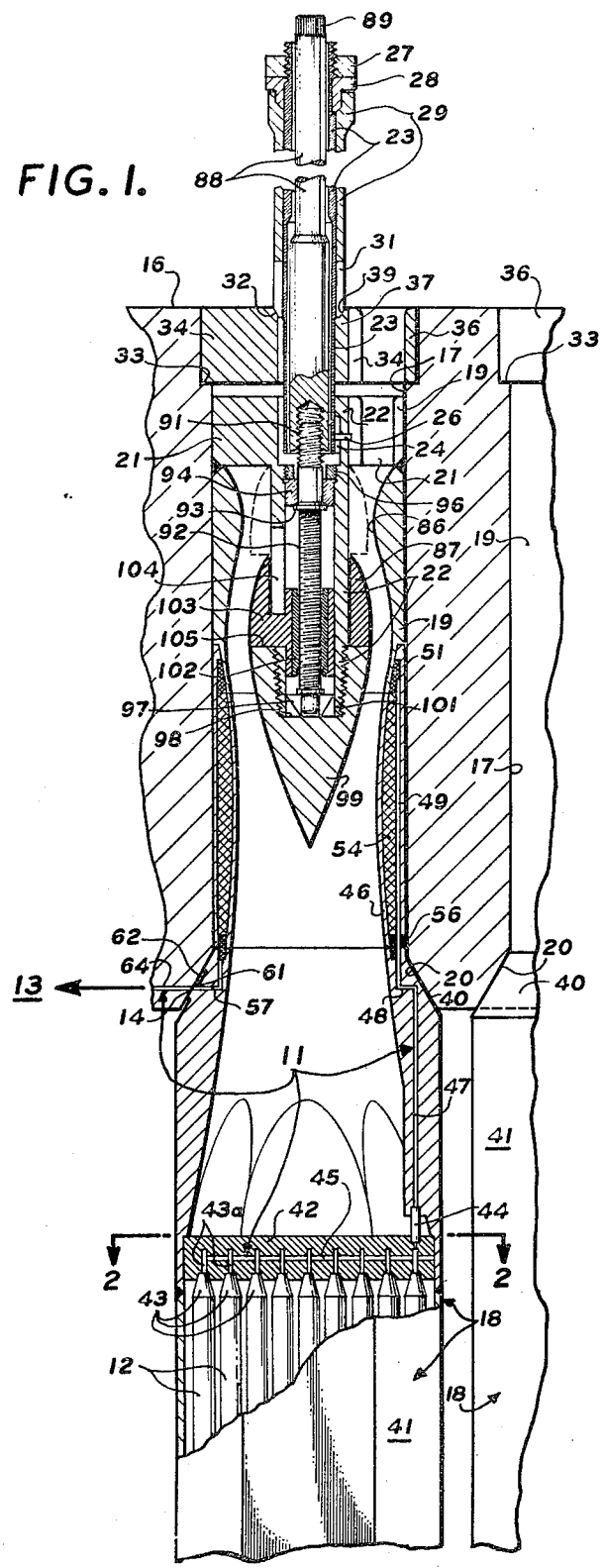
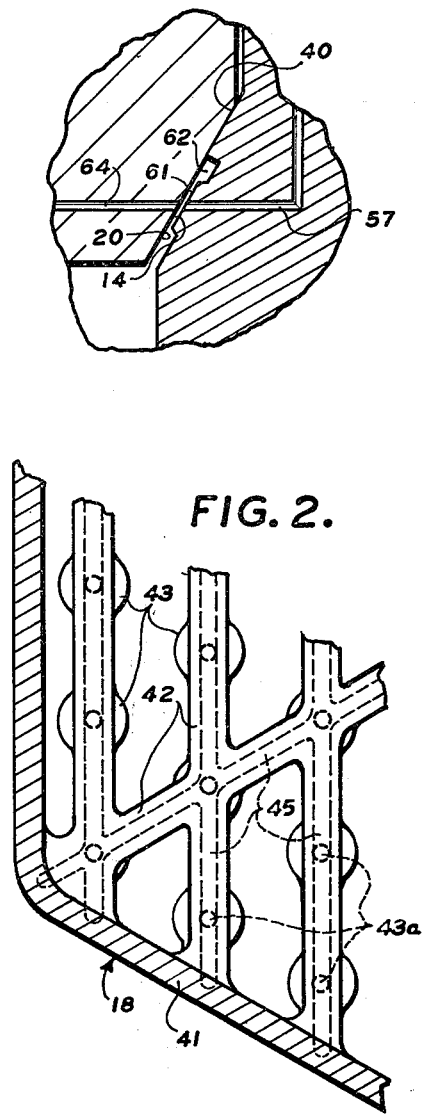

FUEL ELEMENT HAVING VARIABLE ORIFICE

This application is a division of my pending application Ser. No. 863,497 filed Oct. 3, 1969, which issued as U.S. Pat. No. 3,743,576 on July 3, 1973.

This invention relates to gas cooled nuclear reactors and, more particularly, to an improved fuel element for use in a gas cooled nuclear reactor.

One problem encountered in the design of gas cooled nuclear reactors is in the control of the flow of gaseous coolant over the clad fuel containers. Various arrangements have been devised to enable control of the flow of gaseous coolant over the fuel containers. Many of these prior art structures or orificing devices have been subject to the difficulty of unduly impeding coolant flow or producing undesired perturbation therein. Frequently, the accuracy of adjustment has been limited and the distribution of the flow pattern within the fuel element may vary with the amount the orificing device is opened. Finally, control over such prior art orificing devices has often been difficult and unwieldy to effect, and such devices have often offered too high a resistance to coolant flow when in the open position.

An object of the invention is to provide an improved fuel element for use in a gas cooled nuclear reactor.

A further object of the invention is to provide a fuel element having an adjustable orifice which, in the maximum flow or open position, presents a minimum resistance to coolant flow.

It is another object of the invention to provide a fuel element having an adjustable orifice therein which is readily adjustable from the exterior of a reactor core.

Other objects of the invention will become apparent to those skilled in the art from the following description, taken in connection with the accompanying drawings wherein:

FIG. 1 is a partial sectional view of part of a reactor core arrangement having fuel elements constructed in accordance with the invention;

FIG. 2 is an enlarged portion of a sectional view taken along the lines 2-2 of FIG. 1; and FIG. 3 is an enlarged sectional view of a portion of the arrangement of FIG. 1.

A vent passage system 11 for conducting fission products from otherwise sealed containers 12 for fissionable material communicates with a fission product receiving system 13 and the pressure in both systems is maintained substantially less than the coolant gas pressure. The receiving system has a lower pressure than the vent passage system so that fission products will pass from the containers through the passages to the receiving system. At least one bleed passage 14 per fuel element is provided communicating from the cooling system of the reactor to the vent passage system for bleeding coolant gas into the vent passage system.

The general construction of the reactor is of the type illustrated in U.S. Pat. No. 3,533,911, issued Oct. 30, 1970, the disclosure of which is incorporated by reference. A grid structure 16 comprises a plurality of vertical plates arranged to form receptacles 17 for receiving the upper ends of a plurality of fuel elements 18. The cross sections of the receptacles 17 and the upper ends of the fuel elements 18 may be rectangular, or may be circular as shown in the drawings, or may be any other convenient shape. The grid structure 16 is provided with annular bevelled surfaces 20 surrounding the lower ends of the receptacles 17.

The fuel elements 18 each include an upper section consisting of an outer cylindrical wall 19 defining the top part of a tubular housing and which is received in an associated receptacle 17. Three webs 21 project inwardly at 120° intervals from the cylindrical wall 19. The webs 21 are shown in FIG. 1 with one web in section to more clearly illustrate its constructional detail. The webs terminate in a central collar 22. The collar 22 is hollow and is releasably attached to the lower end of a support sleeve 23 by a bayonet type coupling. A part of this coupling is shown in FIG. 1 consisting of an outwardly extending projection 24 (one of three) from the support sleeve 23 and an inwardly extending insert 26 (one of three) through the wall of the collar 22. When the weight on the sleeve is relieved and the sleeve 23 is rotated with respect to the fuel element collar 22, the projections 24 are moved out from underneath the inserts 26 so that the fuel element 18 is released from the support sleeve 23. The support sleeve may be used to lower the fuel elements 18 from the receptacles 17 in the grid structure 16 into a refueling machine (not shown) and to move fresh fuel elements from the refueling machine up into position in the reactor core in the grid receptacles. An example of such a technique is described in the above-mentioned patent.

In order to support the support sleeve 23, and accordingly, support the fuel element 18, the support sleeve is carried through a suitable penetration in the reactor vessel, not illustrated, to a position exterior of the reactor vessel. The broken out section at the top of FIG. 1 illustrates the exterior connections of the support sleeve 23. The support sleeve 23 is threaded at its upper end and a nut 27 is attached thereto. The nut 27 is tightened against a thrust washer 28, and this load, in turn, is transmitted through a thrust tube 29 which is coaxial with the support sleeve 23. The thrust tube 29 extends through the penetration in the unillustrated reactor vessel back down toward the grid structure 16. The lower end of the thrust tube 29 is provided with a series of slots 31 forming a collet section the lower end of which terminates in a bevel 32.

The grid structure 16 includes a plurality of grid inserts disposed in suitably machined recesses 33 at the upper ends of the receptacles 17. Each grid insert consists of three inwardly extending webs 34 which extend inwardly at 120° intervals from the cylindrical outer wall 36 and which terminate in a central collar 37. The outer wall 36 of the grid insert seats in the recess 33 and may be welded therein. The upper end of the collar 37 is provided with a bevelled surface 39 against which the collet section of the thrust tube 29 bears. When the nut 27 is tightened against the washer 28, thrust is transmitted through the thrust tube 29 to the grid insert at the bevelled surface 39. Accordingly, the grid structure 16 supports the fuel elements 18 even though the connections between the supports and the fuel elements (at the nut 27) are brought out to positions exteriorly of the reactor vessel.

The lower portion of the tubular housing of each fuel element 18 is formed by an outer hexagonal wall 41 which is of slightly larger outside dimension than the wall 19. An annular bevelled surface 40 links the outer surface of the wall 19 and the outer surface of the wall 41. The bevelled surface 40 mates against the bevelled surface 20 on the grid structure 16 when the nut 27 is tightened. The fuel containers 12 are supported within the hexagonal wall 41 and extend along most of the length of the wall. Each of the fuel containers or pins 12 includes an outer cladding suitably sealed at its top by means of a plug 43. A plurality of transverse beams 42 are provided near the top of the fuel containers 12 extending across the interior of the housing and intercepting each other to form a network, as shown in FIG. 2. These beams are secured to the plugs 43 at the upper ends of the fuel pins to hold the fuel pins in the illustrated positions. The sealed interiors of the fuel containers 12 communicate with passages 45 in the beams 42 through suitable passages 43a in the plugs 43. The passages 43a and 45 form part of the vent passage system 11 and manifold the containers 12. A single tube 44 extends upwardly at one side of the fuel element and communicates with the passages 45 in the beams 42. The tube 44 forms a further part of the vent passage system 11 and connects the passages 45 to an internal fission product trap, described below.

The upper section 19 of the tubular housing of the fuel element 18 is provided with a section 46 which is hollow and which completely surrounds the fuel element. The tube 44 connects the passages 45 to a passage 47 extending vertically in the outer wall 41 of the lower portion of the fuel element 18. An L-shaped passage 48 connects the upper end of the passage 47 with the hollow interior of the section 46. A vertical tube 49 carries the fission products to the top of the hollow interior of the section 46. There, the products are discharged from the tube 49 into a region filled with porous material 51. The hollow section 46 contains a fission product trap 54 of suitable material such as an activated charcoal adsorber. The fission product trap 54 extends from the porous material 51 down to a region near the closed lower end of the section 46 where further porous material 56 is provided.

During normal operating conditions, the release of gaseous and volatile fission products from the fuel contained within the fuel containers 12 first diffuse through the fuel itself into any pores or interstices in the fuel. Then, by gaseous diffusion, the fission products move through any holes and clearances in the fuel and between the fuel and the external cladding into the manifold system. Some fission product traps may also be provided within the containers 12 themselves for additional delay if needed. The gas then moves upwardly through the tube 44, the passages 47 and 48, and the tube 49 into the porous material 51. The fission products then move through the fission product trap 54 and gas passing therethrough after a delay sufficient to alloy decay of the more active fission products, is collected in the porous material 56 at the bottom thereof.

In order to remove gas from the porous material 56 beneath the fission product trap 54, an L-shaped passage 57 is provided which terminates in the bevelled shoulder 40 extending around the outside of the top of the lower portion of the fuel element 18. The shoulder 40 abuts the corresponding bevelled surface 20 on the lower part of the grid structure 16 surrounding the lower periphery of the receptacle 17. When the nut 27 is tightened, the fuel element is drawn up so that the shoulder 40 engages the grid structure for secure positioning of the fuel element.

The mouth of the passage 57 is surrounded by a projection or boss 61 which projects outward from a recessed section 62 in the shoulder 40. The projection 61 does not extend far enough to engage the bevelled surface 20, leaving a clearance for purposes explained below. A passage 64 is provided in the grid structure 16 leading from the bevelled surface 20 and aligned with the mouth of the passage 57 to conduct gas therefrom to the receiving system 13. The passages 43a and 45, the tube 44, the passages 47 and 48, and tube 49, the fission product trap 54 and the passages 57 and 64 constitute the vent passage system 11 which manifolds gaseous fission products from the sealed fuel containers 12. The passage 64 interconnects with other passages, not shown, in the grid structure 16 to interconnect the vent passage systems of the other fuel elements in the core and conduct all fission product gases to a single receiving system.

In oder to ensure that any break away flow from the internal trap 54 resulting from ambient pressure fluctuations is swept out of the passages leading to the receiving system 13 sufficiently rapidly to avoid substantial local decay and deposit, a bleed-in of coolant gas is utilized. Referring to FIG. 3, the coolant is added by providing a bleed passage 14, namely the clearance between the surface 20 and the projection 61. The bleed-in may be from any appropriate region of the reactor, depending on the inlet pressure desired. In the illustrated embodiment, sufficient space exists between the adjacent fuel elements to permit gas to enter the region.

Provision is made in the fuel element 18 itself for controlling coolant flow. Coolant flow in the fuel element is downward (after passing through the grid insert 36) through the passageway defined by the wall 19 which constitutes the upper section of the tubular housing and then through the passageway defined by the wall 41 which constitutes the lower section of the tubular housing and which flares downward from a circular cross section to the hexagonal cross section shown in FIG. 2. In the lower section, the flowing coolant passes over the clad fuel pins 12 to remove heat therefrom. To minimize drag, the webs 34 and 21 are of streamlined cross section, as are the beams 42.

The upper end of the wall 19 of the tubular housing is provided with a portion of varying interior cross section with respect to the direction of flow of coolant, such portion being indicated generally at 86 and constituting a constriction defined by a smooth convex annular surface. A movable plug 87 is supported coaxially within the housing adjacent the constriction 86. The upper portion of the plug has a convex shape which cooperates with the shape of the varying cross section constriction 86 to form an annular orifice through which coolant flowing downward through the tubular housing passageway must pass. The plug is shown in solid lines in the maximum flow or open position in which it presents a minimum resistance to coolant flow. The free flow area in the annular orifice is equal to the minimum free flow cross sectional area within the fuel element 18. This free flow area is maintained from the initial point of reduction to a location just downstream of the movable portion of the plug where the area increases to form a diffuser section. To decrease the coolant flow through a particular fuel element, the plug 87 is moved upstream into the constricted inlet passageway region. The pressure drop, which is normally associated with the decrease in orifice area, is augmented by the fact that the movable plug is in a high drag configuration in the minimum flow or "closed" position. The closed position of the plug is shown in the dotted lines of FIG. 1.

In order to move the plug 87 from the open position to the closed position and back again, a rotary actuator rod 88 is provided which extends to the exterior of the pressure vessel through the same penetration opening through which the support sleeve 23 extends. The actuator rod includes a geared section 89 on its upper end to enable turning of the actuator rod by a suitable drive mechanism. The actuator rod terminates within the collar 22 of the fuel element and is threaded onto the upper end 91 of a threaded drive screw 92. The drive screw 92 is maintained coaxially within the collar 22 by an annular collar 93 extending therefrom. A retaining ring 94 sits on the collar 93 and is held in place by an externally threaded plug 96 which is threaded to appropriate internal threads in the interior of the collar 22. The lower end of the screw 92 is supported by a thrust bearing 97 which seats in the cavity 98 in a support member or central baffle 99. The baffle 99 is threaded onto an externally threaded section 101 at the lower end of the collar 22 and is located coaxial with the passageway through the housing. The baffle is of streamlined generally conical design to minimize drag and perturbation of coolant flow and forms an inverted teardrop shape with the plug 87 when the plug is in the open position. An internally threaded sleeve 102 surrounds the screw 92 in threaded engagement therewith and moves exially along the screw in response to the rotation thereof. The sleeve 102 is connected to the plug 87 by a series of arms 103 formed as a part of the plug which extend from the sleeve through suitable slots 104 in the collar 22. Thus, when the actuator rod 88 is turned, the screw 92 rotates in place and moves the plug 87 axially of the fuel element passageway, thereby varying the opening of the annular orifice. When in the fully open position, the movable plug 87 mates with the upper end of the baffle 99 at an interface 105 forming the inverted teardrop shape. The orifice actuator rod may be rotated manually above the reactor or remotely by a positioning motor.

The orificing system may be designed to be "fail safe". That is, in the event of a part failure, the orifice may either remain in its original position or be returned to the open position as a result of both flow induced and gravitational forces. Another feature is that the flow can never be completely cut off even in the closed position, since there will be a finite free flow area when the plug is in that position.

The fuel elements include a self-contained orificing system which is easily adjusted and which offers minimum resistance to coolant flow in the open position. Various modifications of the invention in addition to those shown and described herein will become apparent to those skilled in the art from the foregoing description and accompanying drawings.

What is claimed is:

1. A gas-cooled nuclear reactor having disposed therein a plurality of generally vertically extending nuclear fuel elements and wherein a flow of gaseous coolant is maintained in a vertical direction throughout the region wherein said fuel elements are disposed, each of said fuel elements comprising a plurality of fuel pins containing fissionable material, a housing surrounding said fuel pins and having inlet and outlet openings at upper and lower locations therein and a connecting passageway for permitting coolant flow over said fuel pins, said housing having a convex annular constriction in said passageway, a plug disposed within said housing adjacent said convex constriction, and movable relative to said housing, a stationary baffle supported within said passageway downstream of said convex constriction, said plug having a concave surface facing upstream and mating with said baffle to form a streamlined composite of inverted teardrop shape with respect to the direction of coolant flow, said plug and said convex annular constriction forming a generally annular orifice through which the gaseous coolant flows, the size of which orifice is variable in accordance with the vertical position of said plug, and means for moving said plug vertically within said housing between a fully open position wherein it mates with said baffle and a closed position wherein said plug resides in its closest proximity to said convex constriction.

2. A nuclear reactor in accordance with claim 1 wherein said housing comprises an elongated tube open at each end, wherein said fuel pins are elongated and are distributed within said tube in mutually parallel relation extending along the length of said tube and wherein said convex constriction is located near the inlet end of said tube.

3. A nuclear reactor according to claim 2 wherein the free flow area of said annular orifice when said plug is in said fully open position is about equal to the minimum free flow cross sectional area within said tubular housing of said fuel element.

4. A nuclear reactor according to claim 1 wherein said housing includes a diffuser section which is located just downstream of said plug and which at least partially surrounds said baffle.

5. A nuclear reactor in accordance with claim 1 wherein said plug and said baffle have mating surfaces at the interface thereof which surfaces are substantially perpendicular to the axis of said passageway.

6. A nuclear reactor in accordance with claim 1 wherein said fuel elements are located within a surrounding pressure vessel and wherein said means for varying the vertical position of said plug includes a rotary assembly in threaded engagement with said plug, said rotary assembly including a portion at one end having a length sufficient to protrude through a penetration opening in said pressure vessel to an exterior location to enable adjustment of the position of said plug from outside said vessel, and wherein the other end of said rotary assembly is supported by a thrust bearing mounted in said baffle.

7. A gas-cooled nuclear reactor having disposed therein a plurality of generally vertically extending nuclear fuel elements and wherein a downward flow of gaseous coolant is maintained throughout the region wherein said fuel elements are disposed, each of said fuel elements comprising a plurality of elongated parallel fuel pins containing fissionable material, a tubular housing surrounding said fuel pins and having an inlet opening at the upper end thereof and an outlet opening at the lower end thereof and constituting a connecting passageway therebetween for directing coolant flow over said fuel pins, said housing having a convex annular constriction in said fuel element passageway, a movable plug disposed within said housing adjacent said convex constriction, a stationary baffle supported within said passageway downstream of said convex constriction, said plug having a concave surface facing upstream and mating with said baffle to form a streamlined composite of inverted teardrop shape with respect to the downward direction of coolant flow, said plug and said convex annular constriction forming a generally annular orifice through which the gaseous coolant flows, the size of which orifice is variable in accordance with the vertical position of said plug, and means for moving said plug vertically between a lower, fully open position wherein it mates with said baffle and an upper closed position wherein said plug resides in its closest proximity to said convex constriction.

\* \* \* \* \*